Patented Apr. 17, 1934

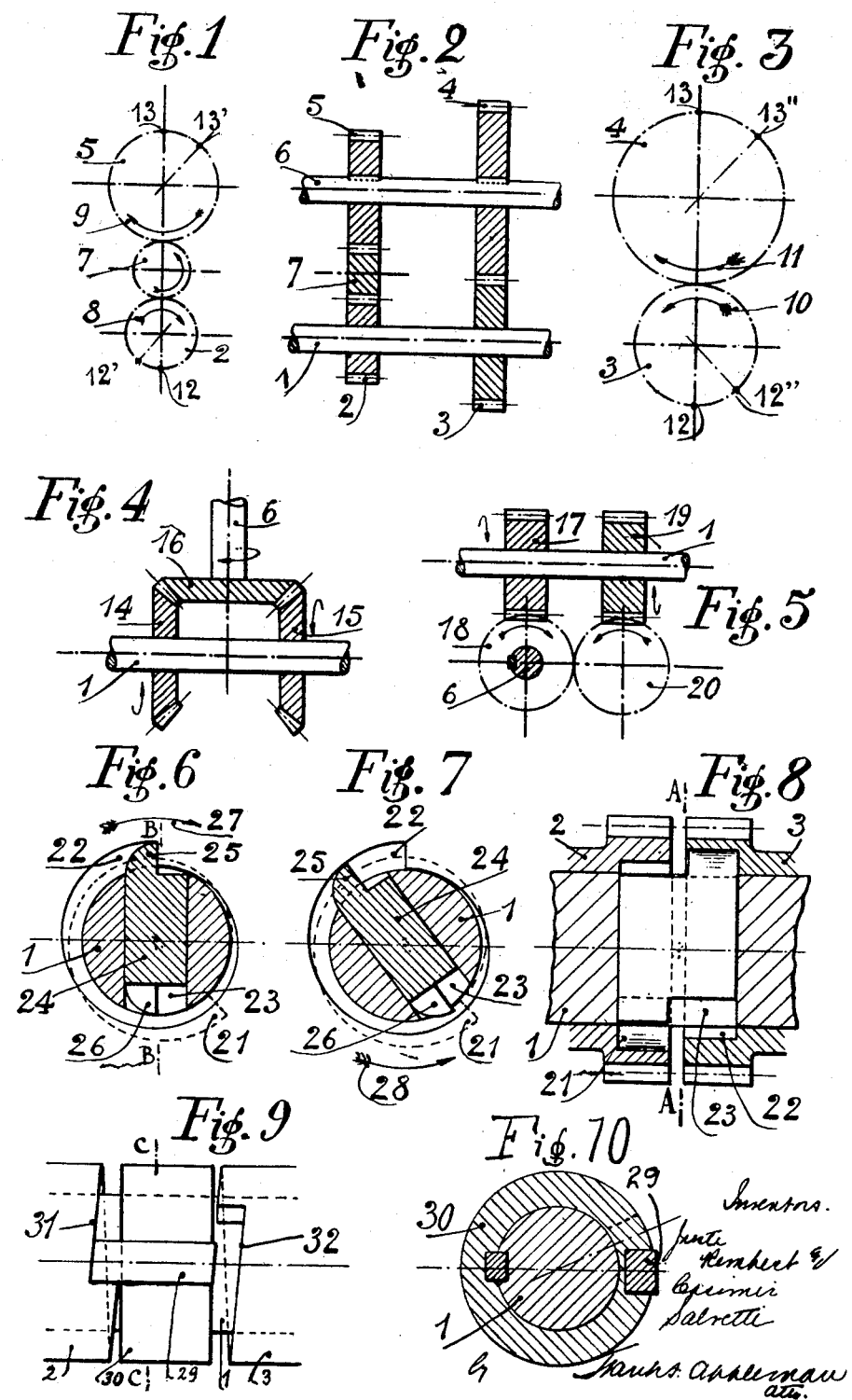

1,954,890

UNITED STATES PATENT OFFICE 1,954,890

DEVICE TO REVERSE THE ROTATION OF COUPLED SHAFTS

Juste Rembert, Alfort, and Casimir Salvetti, Neuilly sur Seine, France, assignors to Dirac, a limited company of France Application May 25, 1929, Serial No. 365,944. Renewed August 1, 1933. In Belgium September 24, 1928

1 Claim. (Cl. 74—59)

It is often useful in the case of certain machines, such as machine tools, steam engines, internal combustion engines, etc., comprising a main shaft driving one or more counter shafts to be able to reverse the rotary motion of this shaft without altering that of the others and, in particular, keep the relative angular positions of the two shafts equal or suitably different as also the same efficiency in both directions, all this in an absolutely automatic way, simply by starting the main shaft in the required direction.

Devices for this purpose and especially applied for reversing four stroke cycle internal combustion engines are already in existence but they are rather complicated or not automatic and can only be utilized for special cases wherein the displacement between various points of the shaft must be taken into account and initial regulation of which can only be made on the axis of the dead points with perfect alignment of the driving clutches.

Moreover these systems have an irregular working, most frequently a jamming at starting.

The present invention provides means to reverse the motion of all coupled shafts, in all these circumstances, in a greatly simplified way.

For this purpose the connection between the shafts is realized by a double train of gear always in mesh, one direct and the other reverse.

The pinions being loose on the main shaft and blocked on the counter shaft the alternate working of one or the other train is obtained by means of a key interdependent with the main shaft lodged in a suitable groove and automatically sliding under the action of ramps so as only to be able to drive one train of pinions at a time.

Thus and by combination of the trains of gearing we see that for different directions of motion of the main shaft that of the countershaft or countershafts will be invariable and all point of the shaft being connected will be displaced symmetrically in equal quantities.

When after a stoppage, the main shaft having any angular position will be run backwards, the key will slip and come away from the pinion it impelled and return to the other at an exactly symmetrical point in relation with the initially fixed axis of regulation.

During this time the countershaft will not have moved and the main shaft will have run loose. Driving then will only be operated in relatively constant positions.

The axis of regulation can be selected at any point and when between the two shafts the same angular relation in each direction of rotation is not required it will suffice to leave between the points of contact of the key and pinions the suitable difference.

Instead of a slipping key hinged blocking catches, spring bolts, clicks, etc., can be used and the loose pinions of the trains of gearing can be fitted as also the key on the counter shaft and the other pinions blocked on the main shaft.

Finally to make the working smoother and avoid risks of jamming of the key and ramps any suitable means can be employed and rolling friction employed instead of sliding, by means of balls or rollers.

The invention will be better understood by aid of the accompanying drawings wherein.

Figs. 1, 2, 3 show the double train of gearing with circular pinions.

Fig. 4 is the same with conical pinions.

Fig. 5 shows the same with skew gear pinions for shafts not parallel.

Fig. 6 a transversal section on A—A 8, the main shaft and its key during driving.

Fig. 7 the same at the time of reversing.

Fig. 8 longitudinal section on B—B of Fig. 6.

Fig. 9 driving device with key slipping lengthwise, Fig. 10 being a cross-section of same along line C—C.

Figs. 11, 12, 13, 14, varied forms for construction of the keys.

Figure 15:
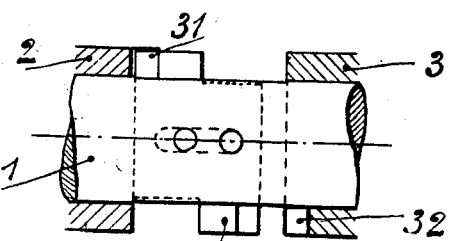

Fig. 15 a driving device with key slipping longitudinally across the main shaft.

Figure 16:
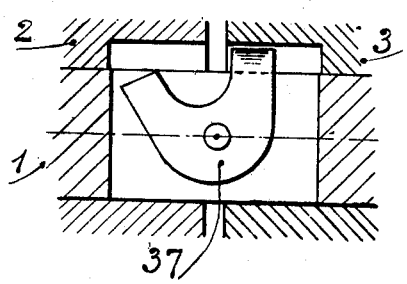
Figure 17:
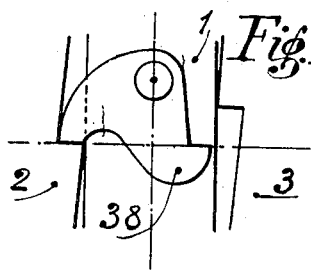

Figs. 16 and 17 are systems of driving with hinged catches.

Figure 18:
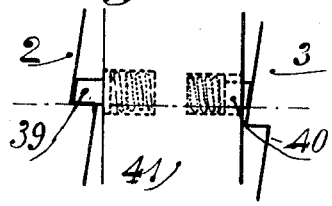
Figure 19:
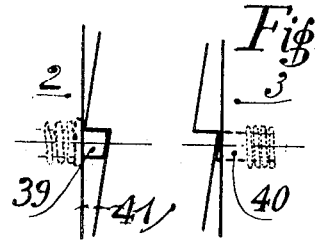

Figs. 18 and 19 show systems of driving with spring bolts.

Figure 20:
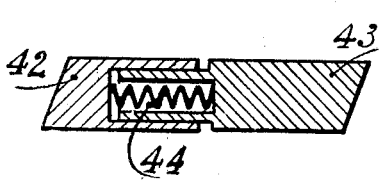

Fig. 20 is an elastic key.

Figure 21:
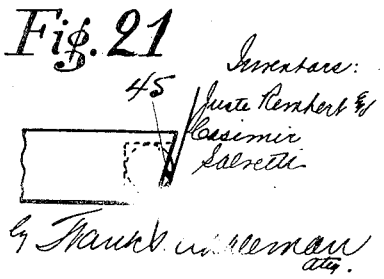

Fig. 21 is a key rubbing through the agency of a ball.

Pinions 2 and 3 are fitted loose, on the main shaft 1 and the pinions 4, 5 blocked on the countershaft 6, gear with them. The pinions 3 and 4 gear directly and pinions 5 and 2 work with an intervening pinion 7, or chain etc.

Thus the main shaft 1 turning in the direction of the arrow 8 Fig. 1 and driving in some way, the pinion 2 will transmit to the countershaft, by means of the pinions 7 and 5 a rotary motion in the direction of the arrow 9. When turning in the direction of the arrow 10 it will drive directly, by the action of the pinions 3 and 4, the countershaft, in the direction of the arrow 11 (Fig. 3).

Thus by combination of these trains of gearing and for rotation in two opposite directions of the main shaft the movement of the counter shaft has not varied. If the ratios of reduced speeds of the two trains of pinions are the same and the main shaft 1 cannot drive more than one loose pinion 2 or 3 at the same time, the angular variations of the two shafts will always be the same but their points will be symmetrically displaced in the direction of rotation.

For example when starting in the direction of the arrow 8, the points 12 and 13 being in line, will come respectively to 12' and 13'. Should starting be in the direction of the arrow 10, the points 12 and 13 would have moved to 12'' and 13''.

Similar results can be obtained with conical pinions.

In Fig. 4 the conical pinions 14, 15 fitted loose on the main shaft 1 though they can be alternately driven therewith will give the pinion 16 an invariable motion when they turn in the opposite direction.

Likewise in Fig. 5 the shafts 1 and 6 will be connected by spiral gear pinions, the pinion 17 will drive pinions 18 directly and pinion 19 will do this with the intervention of pinion 20.

In order that the angular interval of the shaft 1 and 6 may always be the same as that fixed, the alternate driving of the pinions 2, 3 must always occur at the same points and there must be no motion of these pinions during the time of reversing.

Thus stoppage taking place, when the main shaft 1, has brought the pinion 2 to the point 12', it will be necessary, when reversed, to immediately abandon this pinion 2 and, after running loose, catch the pinion 3 at the point 12'' symmetrical with the point 12'.

During this time the countershaft 6 will have remained motionless and it will distribute in its invariable direction 11 at the precise moment when the shaft 1 drives the pinion 3.

This result is attained with the device shown in Figs. 6, 7 and 8.

The pinions 2 and 3 loose on the shaft 1, are each provided with a gullet 21 and 22 in form of a spiral. After a complete revolution the upper and lower part of each spiral are united by a straight surface.

The sides of these spirals correspond with those of a mortise 23 made through the shaft 1. There is a sliding key 24 in the said mortise furnished with two noses 25, 26 and the key is made, for example, so that when the nose 25 is fully engaged in the upper part of the spiral 22, the nose 26 does not pass beyond the opposite side of the shaft 1. In this position impelled by the shaft it will push the pinion 3 in the direction of the arrow 27 in resting on the flat part of the junction of the spiral 22.

When, after stoppage, at any moment, the shaft 1 is started in the direction of the arrow 28, the key 24 will leave the pinion 3 and under the action of the spiral 22 will slip in its mortise 23 and its nose 26 will gradually pass beyond the shaft 1 and as soon as it meets with the flat surface of the spiral 21 it will push it and with it the pinion 2 will be driven in the same direction as the shaft 1.

It is obvious that if the initial fitting of the pinions 2, 3 is made by placing, in the prolongation one of the other, the flat surfaces of the spirals 21, 22 these said surfaces will always be displaced symmetrically and the key 24 will drive one or the other without possible displacement.

During rotation the key 24, subjected to the action of centrifugal power, will rest heavily in the higher part of the spiral which it will impel. Another form of construction is shown in Figs. 9 and 10. The alternate driving of the pinions 2 and 3 is by means of a key 29 slipping for example lengthwise in a suitable socket 30, interdependent with the shaft 1 or in the said shaft itself. Engagement or disengagement and consequently longitudinal slipping of the key 29 is produced by the action of helicoidal ramps 31 and 32 respectively cut on the pinions 2 and 3 the working of which is the same as that with key 24.

To obtain a smoother slipping, the groove for the key of the socket 30 can be given an incline in a suitable way to change the vertical thrust of the shaft on the key into an oblique thrust.

Figure 11:
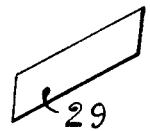

The key then takes the shape shown in Fig. 11 and the groove for the said key can be completely shut to protect the key against centrifugal action.

Figure 12:
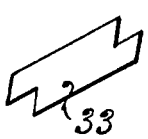

Fig. 12 shows a longitudinal driving key 33 made so that the driving noses will be in line.

Figure 13:
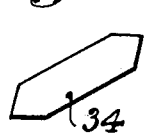

The key 34, Fig. 13 is made with stouter contact angles.

Figure 14:
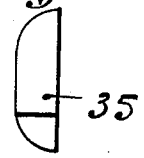

Finally the key 35, Fig. 14 is a simplified form of key 24.

Fig. 15 shows a mode of driving on the same principles but the key 36 slips lengthwise across the shaft 1 and this makes the noses of the helicoidal ramps 31, 32 symmetrically opposite. Figs. 16, 17 show impelling devices by means of hinged catches. The catch 37 lodged inside the shaft 1 drives the pinions 2 and 3 by spiral ramps whereas the catch 38 hinged outside the shaft 1 acts on helicoidal ramps.

The arrangements shown in Figs. 18, 19 realize impulsion by means of spring bolts, 39, 40 which can be fitted on a socket 41 forming one with the shaft 1 and acting on the helicoidal ramps of the pinions 2 and 3; the inverse fitting is made by having the spring bolts on the pinions 2 and 3 and the helicoidal ramps on the socket 41.

To avoid all risk of jamming of the driving key and ramps, it is possible, as in Fig. 20 to make the said key elastic, by having it in two parts 42, 43, sliding one in the other to a certain extent and separated by a spring 44.

Likewise Fig. 21, shows the means to obtain smoother working by makng the driving key rub against the ramps by means of a ball, roller etc. 45 fitted in any suitable manner.

The few forms of construction of the invention described may be varied without change in principle. Construction can also be made in any suitable way and be adapted in any way.

More especially, the points for regulation and angular keying can be chosen at will.

Finally the invention provides the use of the devices for all engines or motors with any number of cycles the main shaft being driving and the countershaft distributing.

It is also possible remaining within the scope of the invention to fit the systems of sliding keys on countershafts.

It suffices, at this moment, to take into account the judicious incline of the ramps or spirals.

What we claim, is:

A transmission device comprising a driving shaft, a driven shaft, two gear mechanisms having the same gear ratio adapted to transmit respectively a reversed and a non-reversed rotation between the shafts and including each a gear wheel rotatably mounted on the driving shaft and provided with an annular regular spiral shaped groove the ends of which are connected through a radial shoulder, the grooves of the two wheels being wound in opposite directions, a sliding key secured to the wheel carrying shaft rotating integrally therewith and engaging simultaneously both grooves, means whereby the rotation of the driving shaft in one direction or the other causes said sliding key to operatively engage the groove shoulder in the gear wheel of the mechanism corresponding to the direction considered, and antifriction devices secured on either end of the key and adapted to engage the grooves of the corresponding wheels.

CASIMIR SALVETTI.
JUSTE REMBERT.